UNITED STATES PATENT OFFICE.

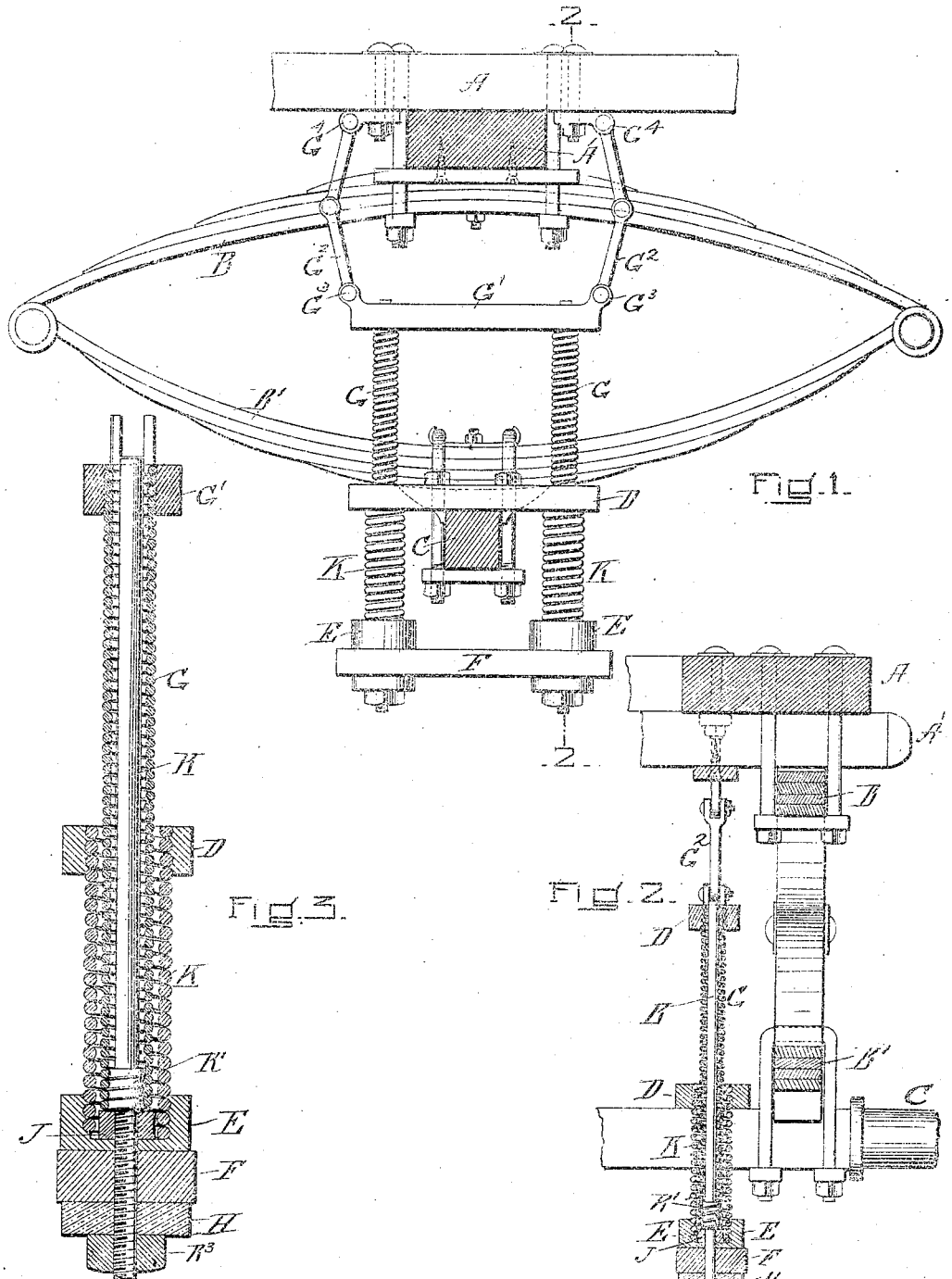

LEVERETT C. HAYNES, OF BOSTON, MASSACHUSETTS.

SPRING FOR VEHICLES.

No. 880,884.  Specification of Letters Patent.  Patented March 3, 1908.

Application filed October 3, 1906. Serial No. 337,303.

*To all whom it may concern:*

Be it known that I, LEVERETT C. HAYNES, a citizen of the United States, of Boston, in the county of Suffolk and State of Massachusetts, have invented a new and useful Improvement in Springs for Vehicles, of which the following, taken in connection with the accompanying drawings, is a specification.

My invention relates to vehicle springs and consists in combining with the ordinary spring an auxiliary mechanism constructed of peculiar construction adapted to operate as a yielding support for the load when the same has proved to be more than the normal amount that the primary spring should bear; the mechanism also provides yielding check devices for preventing the spring from rebounding to a dangerous degree.

The mechanical construction and its functions are illustrated in the accompanying drawings, in which—

Figure 1 is an elevation of my springs showing the connecting parts; Fig. 2 is a vertical section taken on line 2—2 of Fig. 1; Fig. 3 is a vertical section enlarged showing a part of one of the auxiliary mechanisms.

In the drawings A and $A^1$ represent that part of the vehicle to which my improvements are to be applied; B and $B^1$ represent the leaves of an elliptical spring which is attached to the body of the vehicle and to the axle C by any of the well-known devices; a bar or arm D is also rigidly connected to the axle; to this bar one or more springs K are firmly attached by their upper ends, as shown in Fig. 3. The lower ends of these springs are connected to the parts E. The connections between the ends of the springs K, K, may be effected by screw-threads with which the coils of the spring engage as shown, or by brazing or otherwise. A rod R attached to the block E, by brazing or otherwise, extends upward to the stop-bar or arm $G^1$, to which it is rigidly connected.

The function of the above-described parts is to assist the elliptical spring B $B^1$ when overloaded; thus when the load is so great that the bolster A, or any part of the body of the vehicle, is depressed by it sufficiently to bring the said bolster into contact with the stop-bar $G^1$ or the ends of the bolt R, then the further depression will be resisted by the springs K, K, for the reason that the pressure exerted on the stop-bar $G^1$ by the load will be transmitted to the blocks E, E, by the rods R, thence the pressure will be converted to longitudinal strain on the springs K; that is, the said springs will assist the elliptical springs by their resistance to extension.

F is a cross-connecting bar required when two springs are used as shown in the drawings, Fig. 1. The blocks J and H are made of some yielding material like leather or rubber and serve as checks for the enlarged part $R'$ of the rod R and the screw nut $R^3$ (see Fig. 3), and also prevent a tendency of the screw nut to loosen.

To prevent a dangerous reaction of the springs which might cause breakage of some of the parts, and particularly the elliptical springs, I have the following mechanism: Springs G (of the extension order) are rigidly fastened at their lower ends to the enlarged parts $R^4$ of the rods R, and their upper ends are made fast to the stop-bar $G^1$, and the said stop-bar is connected by the toggle-device $G^2$ and pivots $G^3$, $G^4$, or chains if desirable, to the body of the vehicle, so that any strain caused by the rebound of the load will be transferred to the springs G, which will check the said rebound and prevent it from doing injury to the elliptical springs or other parts. It is obvious that by slight mechanical changes single sets of springs G and K may be used.

Claims

Springs for vehicles, comprising an elliptical spring attached to the body of the vehicle and to the axle; an axle-bar attached to the axle; extension springs attached to said axle-bar and extending downward to, and attached at their lower ends to the lower ends of rods, and said rods which extend upward through the said extension springs and through the said axle-bar to the stop-bar $G^1$; and the said stop-bar; toggles constructed to connect said stop-bar to the body of the vehicle; closed springs attached to the said stop bar and extending downward through the said axle bar and the said extension springs and rigidly attached to the lower ends of the said rods and said extension springs substantially as and for the purpose set forth.

In testimony whereof, I have signed my name to this specification in the presence of two subscribing witnesses, on this first day of October A. D. 1906.

LEVERETT C. HAYNES.

Witnesses:
 HARRY C. LUCE,
 FRANK G. PARKER.